(12) United States Patent
Kumar et al.

(10) Patent No.: US 8,699,350 B1
(45) Date of Patent: *Apr. 15, 2014

(54) OPTIMIZING TRAFFIC IN A DATA NETWORK

(75) Inventors: Alok Kumar, Fremont, CA (US); Michael Frumkin, Santa Clara, CA (US)

(73) Assignee: Google Inc., Mountain View, CA (US)

(*) Notice: Subject to any disclaimer, the term of this patent is extended or adjusted under 35 U.S.C. 154(b) by 119 days.

This patent is subject to a terminal disclaimer.

(21) Appl. No.: 13/233,362

(22) Filed: Sep. 15, 2011

(51) Int. Cl.
*H04L 12/26* (2006.01)

(52) U.S. Cl.
USPC .......................................... 370/238; 370/252

(58) Field of Classification Search
USPC ......... 370/216, 217, 218, 221, 222, 223, 225, 370/229, 236, 238, 241, 242, 244, 248, 249, 370/252
See application file for complete search history.

(56) References Cited

U.S. PATENT DOCUMENTS

| | | | |
|---|---|---|---|
| 7,349,350 B2 | 3/2008 | Liu | |
| 2005/0031339 A1 | 2/2005 | Qiao et al. | |
| 2005/0060429 A1* | 3/2005 | Massoulie et al. | 709/243 |
| 2005/0088965 A1* | 4/2005 | Atlas et al. | 370/216 |
| 2006/0268749 A1* | 11/2006 | Rahman et al. | 370/256 |
| 2007/0086361 A1* | 4/2007 | Allan et al. | 370/254 |
| 2007/0263592 A1 | 11/2007 | Agarwal et al. | |
| 2008/0168510 A1 | 7/2008 | Small et al. | |
| 2008/0279101 A1 | 11/2008 | Wu et al. | |
| 2010/0331002 A1 | 12/2010 | Small et al. | |

OTHER PUBLICATIONS

David Eppstein, "Finding the k Shortest Paths", Department of Information and Computer Science, Mar. 31, 1997, pp. 1-26.
David Eppstein, "Finding the k Shortest Paths", Department of Information and Computer Science, Tech. Report 94-26, May 31, 1994, 23 pages.
Jin Y. Yen, "Finding the K Shortest Loopless Paths in a Network," Management Science, vol. 17, No. 11., Jul. 1971, pp. 712-716.
K. Jansen et al., "A Lazy Version of Eppstein's K Shortest Paths Algorithm", 2003, pp. 179-191.
Office Action in U.S. Appl. No. 13/302,952 dated Jun. 3, 2013.
Tam et al., "Trimming the Multipath for Efficient Dynamic Routing", Department of Electrical and Computer Engineering, Sep. 5, 2011, 9 pages.

* cited by examiner

*Primary Examiner* — Hoon J Chung
*Assistant Examiner* — Feben M Haile
(74) *Attorney, Agent, or Firm* — Foley & Lardner LLP; Edward A. Gordon (57) ABSTRACT

Systems and methods for optimizing traffic in a data network are provided. Network traffic may be optimized by associating costs with data links that connect network nodes. The method includes determining a set of lowest cost paths between a source network node and a destination network node. Paths that contain loops may be excluded from the set of lowest cost paths. Exploration of certain paths may also be delayed or prevented entirely.

20 Claims, 7 Drawing Sheets

OPTIMIZING TRAFFIC IN A DATA NETWORK

BACKGROUND

The present disclosure relates generally to optimizing traffic in a data network, and more particularly, to determining a plurality of lowest cost paths for routing data from a source network node to a destination network node.

Data networks may include any number of routers and other devices that direct the transmission of data from one location to another. For example, a source (e.g., a computer, a server, a data center, a router, etc.) may transmit data to a destination (e.g., another computer, data center, router, etc.) via the data network using any number of different paths. Each data connection in a given path may also have a number of associated characteristics (e.g., latency, bandwidth, etc.). These characteristics can be used to optimize how the data is transmitted from the source to the destination.

SUMMARY

Implementations of systems and methods for optimizing traffic in a data network are described herein. One implementation is a method that includes retrieving, from a memory, map data identifying a plurality of network nodes and a plurality of data links between the network nodes. Each data link has an associated cost. The method also includes receiving an identification of a source network node and a destination network node in the plurality of network nodes. The method further includes determining, by a processing circuit, a set of lowest cost paths between the destination network node and each other network node of the plurality based in part on the associated costs of the plurality of data links. The method additionally includes determining, by the processing circuit, a set of paths to be explored based in part on the difference between the map data and the set of lowest cost paths between the plurality of network nodes and the destination network node. The method also includes determining, by the processing circuit, a set of lowest cost paths from the source network node to the destination network node by exploring one or more paths in the set of paths to be explored. The set of lowest cost paths from the source network node to the destination network node is determined by excluding an explored path that contains a loop.

Another implementation is a processing circuit configured to retrieve, from a memory, map data identifying a plurality of network nodes and a plurality of data links between the network nodes. Each data link has an associated cost. The processing circuit is further configured to receive an identification of a source network node and a destination network node in the plurality of network nodes. The processing circuit is also configured to determine a set of lowest cost paths between the destination network node and each other network node of the plurality based in part on the associated costs of the plurality of data links. The processing circuit is additionally configured to determine a set of paths to be explored based in part on the difference between the map data and the set of lowest cost paths between the plurality of network nodes and the destination network node. The processing circuit is also configured to determine a set of lowest cost paths from the source network node to the destination network node by exploring one or more paths in the set of paths to be explored. The set of lowest cost paths from the source network node to the destination network node is determined by excluding an explored path that contains a loop.

A further implementation is one or more computer-computer readable media having instructions stored therein, the instructions being executable by one or more processors to cause the one or more processors to perform operations. The operations includes retrieving, from a memory, map data identifying a plurality of network nodes and a plurality of data links between the network nodes. Each data link has an associated cost. The operations also includes receiving an identification of a source network node and a destination network node in the plurality of network nodes. The operations further includes determining, by the one or more processors, a set of lowest cost paths between the destination network node and each other network node of the plurality based in part on the associated costs of the plurality of data links. The operations additionally includes generating, by the one or more processors, a set of paths to be explored based in part on the difference between the map data and the set of lowest cost paths between the plurality of network nodes and the destination network node. The operations further includes determining, by the one or more processors, a set of lowest cost paths from the source network node to the destination network node by exploring one or more paths in the set of paths to be explored. The set of lowest cost paths from the source network node to the destination network node is determined by excluding an explored path that contains a loop.

These implementations are mentioned not to limit or define the scope of the invention, but to provide examples of implementations of the invention to aid in understanding thereof. Particular implementations can be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

DETAILED DESCRIPTION

According to some aspects of the present disclosure, a plurality of lowest cost paths between a source network node and a destination network node in a data network can be found by generating a map of the network and traversing data links.

Each data link may have one or more properties or characteristics (e.g., latency, bandwidth, etc.), referred to herein as costs, that can be used to associate a cost to sending data over a particular data link. The map of the network can be traversed to analyze the cost of taking different paths from a source node to a destination node. In some implementations, paths that contain loops can be excluded from further exploration, decreasing the search time for the lowest cost paths from the source node to the destination node and further optimizing the traffic in the network. In other implementations, exploration of certain paths can be delayed until it is determined that a node in the path can reach the destination network node.

Figure 1:
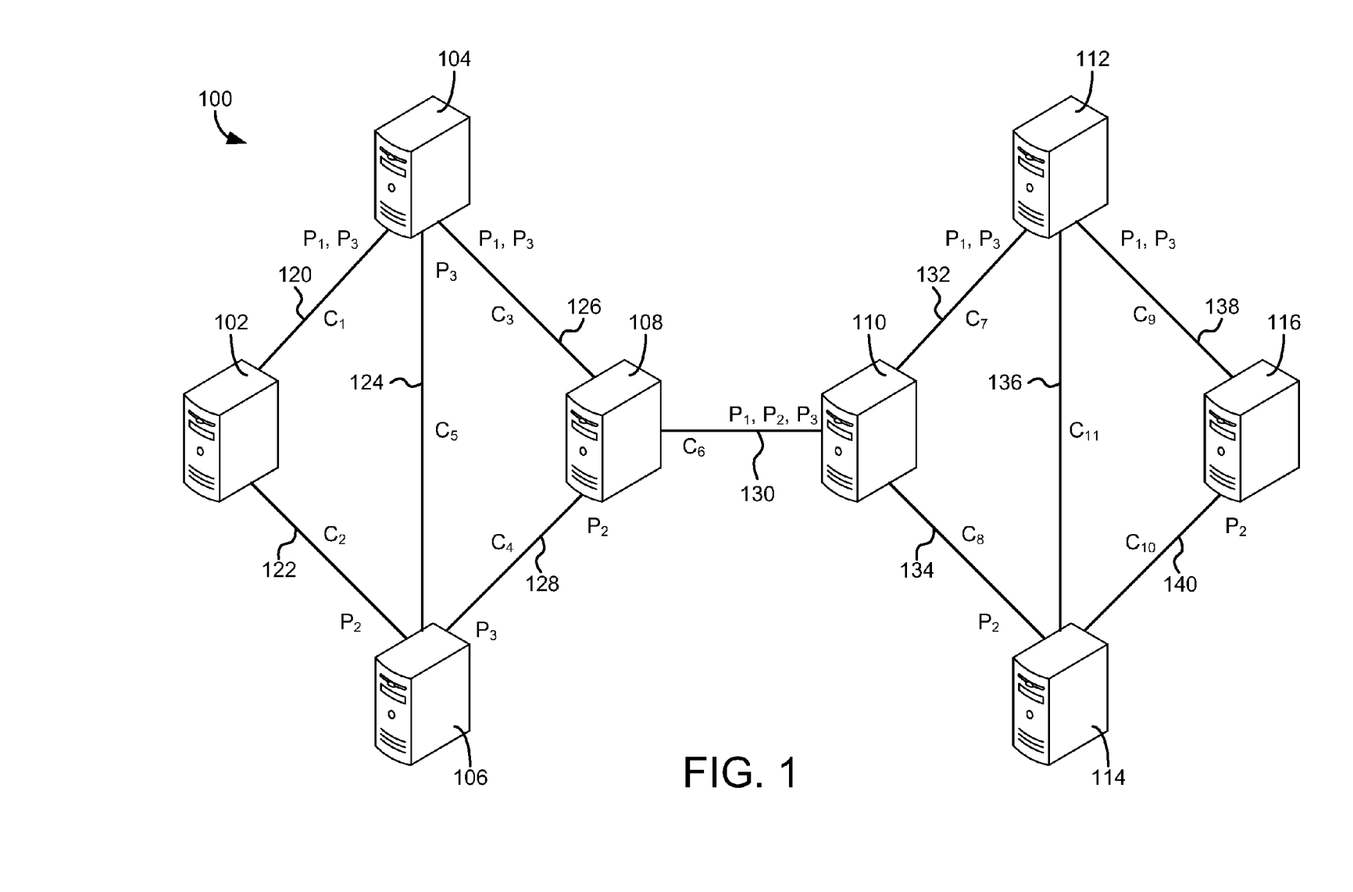
FIG. 1 is an illustration of an example of data network.

FIG. 1 shows an illustration of an example data network 100. Data network 100 includes a plurality of network nodes 102-116 connected by data links 120-140. Each of network nodes 102-116 may be one or more electronic devices configured to transmit data within data network 100. For example, each of network nodes 102-116 may include one or more data centers, servers, computers, routers, switches, mobile devices, and/or other computing devices.

Data network 100 is also shown to include data links 120-140, which allow data to be transmitted between network nodes 102-116. For example, network node 102 may transmit data to network node 104 via data link 120. Data links 120 may be any type of hardwired and/or wireless data connection. For example, data link 120 may be a hardwired fiber optic line or a wireless satellite connection that conveys data from network node 102 to network node 104. Data links 120-140 may be bidirectional or unidirectional, in some cases. For example, data link 138 may be a bidirectional link that allows network node 112 to convey data to network node 116 and vice versa.

Each of data links 120-140 is shown to have an associated cost, denoted $c_1$-$c_{11}$ in FIG. 1. Costs $c_1$-$c_{11}$ may be one or more values associated with the characteristics of data links 120-140 and/or network nodes 102-116. In one example, costs $c_1$-$c_{11}$ may be related to the speed of data links 120-140. For example, costs $c_1$-$c_{11}$ may be the one-way or round-trip latency experienced by a data link when data is sent from one network node to another. Latency may be measured by sending a "ping" (e.g., a transmission of data) from a network node across one of data links 120-140 and measuring the amount of time taken for the data to reach the other network node connected to the data link. In other examples, any number of characteristics of data links 120-140 (e.g., bandwidth, affinities, financial cost, usage capacity, etc.) may be used to calculate costs $c_1$-$c_{11}$.

The transmission of data from a source node to a destination node in data network 100 may follow any number of different paths. In general, a path may be an ordered set of data links and/or network nodes that are connected by data links. By way of example, network node 102 (e.g., a source node) may attempt to send data to network node 116 (e.g., a destination node) via data network 100. The data may be routed over a number of different paths. For example, one path, $P_1$, may include data links 120, 126, 130, 132, and 138. Another path, $P_2$, may include data links 122, 128, 130, 134, and 140. Each potential path may also have an associated cost. For example, path $P_1$ may have a cost $c_x$ that is the sum of costs associated with its data lines (e.g., costs $c_1$, $c_3$, $c_6$, $c_7$ and $c_9$). Similarly, path $P_2$ may have cost $c_y$ that is the sum of costs associated with its own data lines (e.g., costs $c_2$, $c_4$, $c_6$, $c_8$, and $c_{10}$).

Traffic routing decisions in data network 100 can be made by determining the lowest cost path to route data from a source node to a destination node. For example, the cost of Path $P_1$ is less than the cost of path $P_2$ (i.e., $c_x < c_y$), network 100 may route traffic from network node 102 to network node 116 via path $P_1$. For each source-destination pair, a different lowest-cost path may be determined and used by network 100 to route data. This allows the traffic in data network 100 to always take the optimal route, thereby improving the performance of network 100.

A number of different techniques can be used to determine which path has the lowest cost. This type of problem can be referred to as the single shortest path problem, although this is a misnomer in cases where the costs are not actual distances between nodes.

A related, and more complex, problem relates to finding not only the lowest cost path, but a set of the lowest cost paths between a source node and a destination node. Sometimes called the k-shortest path problem, the goal in this problem is to find not only the path having the overall lowest cost, but the set of lowest cost paths from the source node to the destination node up to the $k^{th}$ lowest cost path, k being any positive integer greater than one. These types of problems require significantly more computational time and resources than for finding just the overall lowest cost path from one node to another.

In data networks, the set of lowest cost paths between a source network node and a destination network node can be used in the network to adapt to changing network conditions. For example, path $P_1$ in data network 100 may be of lower cost than path $P_2$. However, if data link 138 becomes unavailable, path $P_1$ is no longer the optimal route and traffic must be rerouted around data link 138. In such a case, the next lowest cost path (e.g., path $P_2$ or another path) may be used instead to route data from network node 102 to network node 116. This allows network 100 to continue to route data in an optimal way, even when the network conditions change.

In one example, data network 100 may be part of a class of networks that dynamically control network traffic using the costs associated with data links 120-140. For example, data network 100 may be a multiprotocol label switching (MPLS) network, according to one implementation. In MPLS networks, labels are assigned to data packets at a first router known as a label edge router (LER). The appended labels contain path information used to route data throughout the network. The path corresponding to the label is often called the label switched path (LSP). Label switching routers (LSRs) receive the labeled data packets in MPLS networks and make routing decisions based on the content of a label. In such a case, the set of lowest cost paths from a source node to a destination can be used to select an appropriate LSP to route the sent data.

In addition to finding a set of lowest cost paths between a source node and a destination node in data network 100, another constraint may be that the set of lowest cost paths between the source node and the destination node contain only loopless paths. A loopless path is any path that passes through a single network node only once. For example, the path P3 formed by data links 120, 126, 128, 124, 126, 130, 132, and 138 contains a loop because path P3 passes through network node 104 twice. In general, this means that a network node (e.g., network node 104) transmits data to one source, only to receive it again, and then has to retransmit it to a different source. Therefore, paths containing loops may be avoided from inclusion in the set of lowest cost paths between the source node and the destination node in some cases, to prevent making redundant or unnecessary data transmission.

In some situations, a path containing a loop may still be within the set of lowest cost paths between the source node and the destination node, due to higher costs associated with alternative paths. For example, if path P1 is the overall lowest cost path having a cost of $c_x$, path P3 may have a cost of $c_z$ equal to the sum of $c_x$, $c_3$, $c_4$, and $c_5$. If the cost of path P3 is less than that of path P2 (i.e., $c_z < c_y$), path P2 may be included in the set of lowest cost paths before P3, even though path P2 contains a loop. Therefore, some implementations of the optimization techniques disclosed herein may further detect the presence of loops and exclude paths containing loops from the set of lowest cost paths between the source network node and the destination network node.

Figure 2:
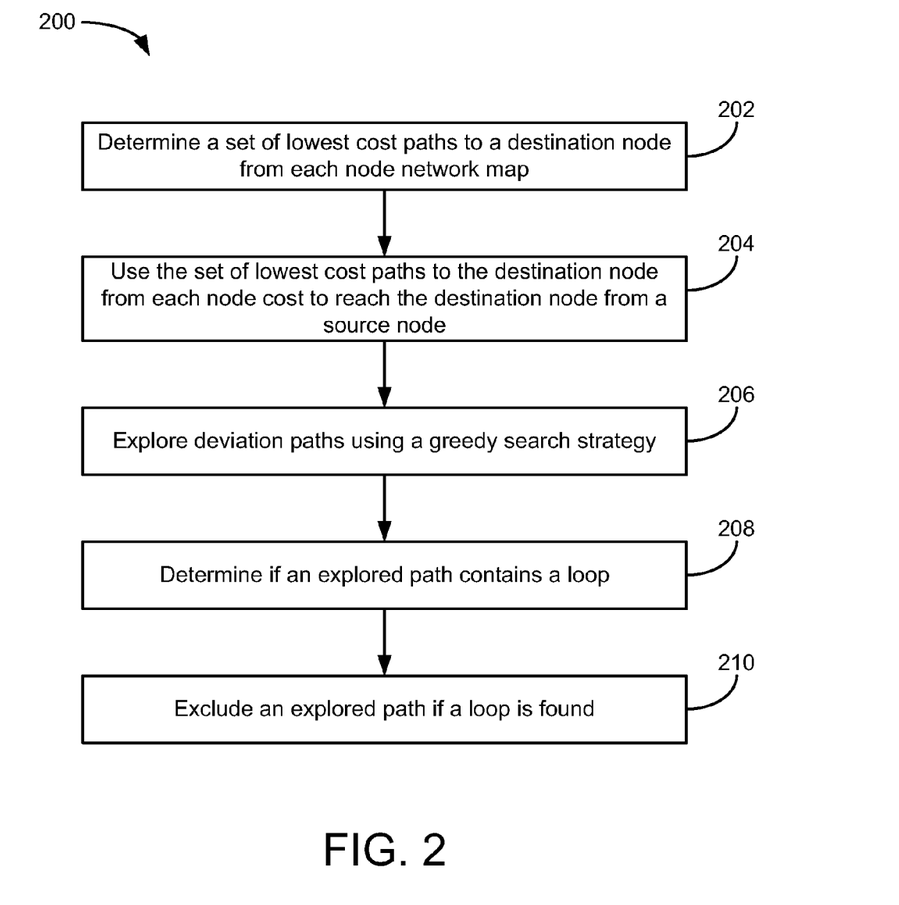
FIG. 2 is a flow diagram of an example process for determining a set of loopless, lowest cost paths from a source network node to a destination network node in a data network.

Referring now to FIG. 2, a process for determining a set of loopless, lowest cost paths from a source node to a destination node in a data network is shown, according to one example. The set of loopless, lowest cost paths between the source network node and the destination network node includes two or more lowest cost paths over which data can be sent from the source network node to the destination network node. The paths in the set are also loopless, meaning that each path traverses any given network node at a maximum of one time.

Process 200 includes determining a set of lowest cost paths to a destination node from each node of a network map (block 202). In general, the set of lowest cost paths from each node to a destination node includes the overall lowest cost paths from each individual node in the network map to the destination node. On each path, the cumulative cost to reach the destination node from a given node is assigned to the given node. This cumulative cost corresponds to the sum of costs associated with the data links traversed in the path. In other words, the set of lowest cost paths from each node to a destination is a combination of the overall lowest cost paths from each node in the network map to the destination node.

The set of lowest cost paths from each node to the destination node differs from that of the set of lowest cost paths from a source node to the destination node. The set of lowest cost paths to the destination network node contains the overall lowest cost path from each node of the network to the destination node. This set includes the overall lowest cost path from the source node to the destination network node. In contrast, the set of lowest cost paths between the source node and the destination node includes not only the overall lowest cost path from the source node to the destination node, but also the next k−1 lowest cost paths (e.g., the second lowest cost path, the third lowest cost path, etc.) between the source network node and the destination network node.

A set of lowest cost paths from each node to a destination node may be generated in some implementations by performing a single source shortest path search strategy from each node in the network. The lowest cost path from each node to the destination network node can then be used to construct the set of lowest cost paths to a destination. In some implementations, the data links may be reversed and a search strategy that originates from the destination network node can be used to construct the set of lowest cost paths from each node to a destination. In either case, the constructed set of lowest cost paths from each node to the destination node provides the lowest cost path from any given node to the destination node. Given a source node, this allows the lowest cost path from the source to the destination to be determined by finding the corresponding path from the source to the destination in the set of lowest cost paths from each node to the destination node. The set of lowest cost paths from each node to the destination node also allows the total cost of the lowest cost path from any network node to be determined using the properties of the node in the set of lowest cost paths from each node to the destination node.

Process 200 includes using the set of lowest cost paths from each node to the destination to determine path deviation costs to reach the destination node from a source node (block 204). Since the set of lowest cost paths from each node to the destination includes the lowest cost path from the source to the destination, any deviations from this path incurs a greater cost than if the lowest cost path between the source and destination is taken. These deviation costs can be determined using the costs associated with the data links that are not part of the lowest cost path between the source and the destination. For example, the deviation paths for the network map can be determined by taking the difference between the network map and the set of lowest cost paths between each node and the destination.

One way to determine the set of lowest cost paths between the source and destination nodes is to begin with the assumption that most, if not all, of the paths in the set are slight deviations from the overall lowest cost path from the source to the destination. Therefore, deviation paths from the overall lowest cost path can be explored to find additional low cost paths from the source to the destination. This exploration can be repeated for various deviation paths until the desired number of lowest cost paths between the source network node and the destination network node are discovered.

Process 200 includes exploring deviation paths using a greedy search strategy (block 206). In general, greedy search strategies operate by making a choice that optimizes the solution at each decision point. For example, at any given node with two potential data links to explore, the search strategy may choose to always explore the lowest cost data link. Any number of path searching strategies may be utilized. For example, a path searching strategy that utilizes a sorted heap of paths is described in the article by David Eppstein, entitled "Finding the k Shortest Paths," published in the 35th IEEE Symposium Foundations of Computer Science (1994).

Process 200 includes determining if an explored path contains a loop (block 208). As various paths are explored, a check is made at each node to determine if a node or a data link is already present in the currently explored path. For example, a path may be explored from nodes A to B to C. A check may then be made to ensure that the next traversed path does not lead from node C back to nodes A or B. This may be done either by actually traversing the data link or by only examining the direction of the data link. For example, if the data link goes from C to B, the link may be traversed back to node B. Since node B is already in the set of explored nodes, this indicates that the currently explored path contains a loop. In another example, the data link from C to B may be explored itself, without actually traversing the link. Since the data link itself indicates that it leads to node B, the endpoint of the data link may be used to determine that node B has already been explored and that a loop exists.

Process 200 includes excluding an explored path if a loop is found (block 210). If an explored path is determined to contain a loop in step 208, the explored path may be flagged or otherwise excluded from inclusion in the set of lowest cost paths. Although a loop-containing path may have a lower cost than other paths from the source node to the destination node, it may be excluded in some implementations. Data transmission over a loop is redundant and does not offer any routing advantages over using only its base path (e.g., the loop-containing path minus the loop). In some implementations, exploration of the current path may also terminate when a loop is found. In such a case, other paths may be explored instead.

Figure 3:
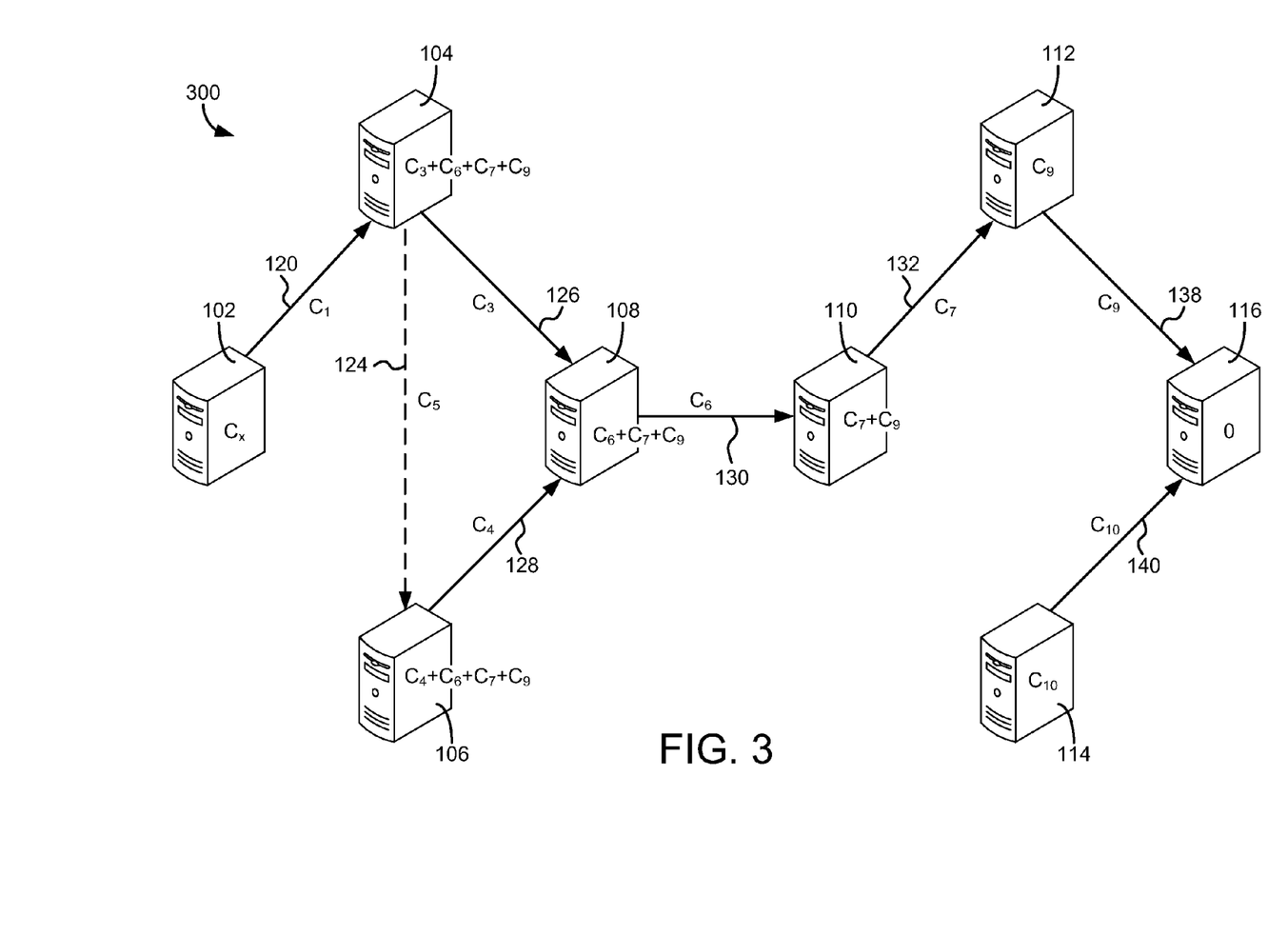
FIG. 3 is an illustration of a set of lowest cost paths from each node of the data network shown in FIG. 1 to a destination network node.

FIG. 3 shows a set of lowest cost paths from each node in a network to a destination node is shown, according to one example. As shown, set 300 is constructed using the map of data network 100 in FIG. 1 with network node 116 as the destination node. For each network node 102-116 in data network 100, the lowest cost path to network node 116 is determined. In some implementations, set 300 may be constructed by starting at each of network nodes 102-114 and finding the lowest cost path to network node 116. For example, two potential paths may be taken from network node 104 to network node 108. In one path, data links 124 and 128 are traversed from network node 104, having an associated cost of $c_4+c_5$. In another path, data link 126 is traversed, having an associated cost of $c_3$. As shown, traversing data link 126 has a lower associated cost (e.g., $c_3<c_4+c_5$). Therefore, data link 124 is included in set 300. In other implementations, set 300 may be constructed by reversing data links 120-140 and finding the single source shortest path from network node 116 to each of network nodes 102-114. Set 300 may be constructed, for example, using the single-source shortest path search techniques proposed by Edsger Dijkstra or variants thereof (e.g., utilizing a Fibonacci heap as a priority queue, etc.).

A cumulative cost may be maintained for each of network nodes 102-116 in set 300. The cumulative cost represents the total cost from the node when traversing the lowest cost path to the destination, i.e., network node 116. The cumulative cost may be determined, for example, by summing the costs of the data links in the path from the given network node to the destination. For example, data link 140 has an associated cost $c_{10}$ and is also the lowest cost path between network node 114 and network node 116. Therefore, the cumulative cost for network node 114 is equal to $c_{10}$. In another example, the cumulative cost at network node 108 is equal to the sum of costs for data links 130, 132, and 138 because each of these data links are in the lowest cost path between network node 108 and network node 116.

Figure 4:
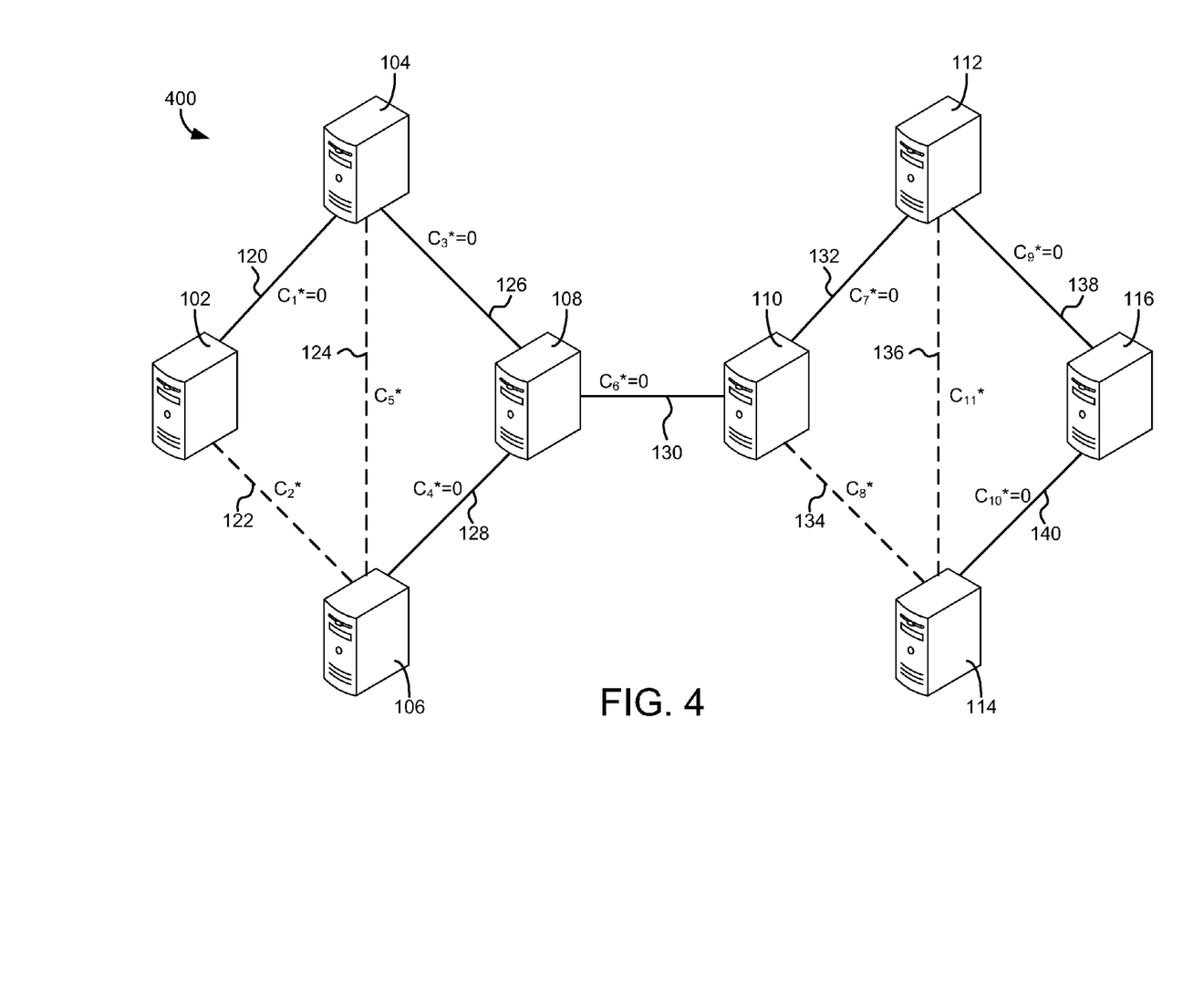
FIG. 4 is an illustration of the set of lowest cost paths from each network node to a destination from FIG. 3 showing overlaid path deviations and updated costs.

FIG. 4 shows a set of lowest cost paths between network nodes and a destination network node is shown with overlaid path deviations, according to another example. A map 400 may be constructed using set 300 in FIG. 3 and data network 100 in FIG. 1. Map 400 includes one or more sets of network nodes and/or one or more sets of data links with updated costs. For example, map 400 may be stored in one or more data structures, such as a table, queue, list, etc. As shown, the costs associated with the data links in map 400 have been updated to reflect the cost of deviating from the lowest cost paths in set 300 (denoted as c* in FIG. 4). For example, the costs associated with data links 120, 126, 128, 130, 132, 138, and 140 have been updated in map 400 to each be zero. Since it is already know that the lowest cost path from any of network nodes 102-114 to the destination network node 116 is given by set 300, any return to these nodes while exploring a path deviation will incur no additional cost.

Overlaid on map 400 are data links 122, 124, 134, and 136, which are path deviations from that of set 300. Although set 300 provides the overall lowest cost path from source network node 102 to destination network node 116, other paths should still be explored to find the other lowest cost paths up to the $k^{th}$ lowest cost path. This may be done by exploring the effects of deviating from the path between the source node and the destination node in set 300.

Similar to the data links in set 300, the costs associated with data links 122, 124, 134, and 136 (i.e., the path deviations) may be updated to reflect the cost of deviating from the path between the source and destination in set 300 (e.g., the overall lowest cost path between the source and destination). For example, the costs may be updated as follows:

$$c_i^* = c_i + d(e\_dst) - d(e\_src)$$

where $c_i$ is the original cost of the data link, e_src is the tail of the data link, e_dst is the head of the data link (i.e., data flows from the tail to the head of the data link), d(e_dst) is the overall lowest cost to the destination from the tail of the data link, and d(e_src) is the overall lowest cost to the destination from the head of the data link. Both d(e_dst) and d(e_scr) may be determined, for example, using the overall lowest cost associated with the respective nodes of the data link in set 300.

In one example of updating the cost for a path deviation, the cost of data link 122 may be updated in map 400 using the overall lowest cost the to destination from set 300 with the original cost of the data link from data network 100. This cost represents the added cost of deviating from the overall lowest cost path between the source and destination in set 300. The overall lowest cost to reach the destination network node 116 from network node 106, i.e., d(e_src), is $c_4+c_6+c_7+c_9$, as shown in set 300. Similarly, the overall lowest cost to reach the destination network node 116 from network node 102 is $c_x = c_1+c_3+c_6+c_7+c_9$, also shown in set 300. This gives an updated cost for traversing data link 122 in map 400 of:

$$c_2^* = c_2 + (c_4+c_c+c_7+c_9) - (c_1+c_3+c_6+c_7+c_9) = c_2+c_4-c_1-c_3$$

Such a cost value allows the added cost of transmitting data over data link 122 instead of data link 120 to be quantified.

The updated costs for the path deviations in map 400 are as follows:

TABLE 1

| Path Deviation | Direction of Data Flow | Updated Cost |
| --- | --- | --- |
| data link 122 | node 102 to node 106 | $c_2 + c_4 - c_1 - c_3$ |
| data link 124 | node 106 to node 104 | $c_5 + c_3 - c_4$ |
| data link 134 | node 110 to node 114 | $c_8 + c_{10} - c_7 - c_9$ |
| data link 136 | node 114 to node 112 | $c_{11} + c_9 - c_{10}$ |

In addition to the path deviations listed in Table 1, more path deviations may exist if any of data links 120-140 in map 400 are bidirectional. For example, if data link 124 also allows data flow from network node 104 to network node 106, the updated cost associated with this data transmission would be $c_5+c_4-c_3$. Similarly, reversal of the flow of data across any of the data links in set 300 could also be categorized as a path deviation. For example, transmitting data from network node 110 to network node 108 via data link 130 would be $c_6+c_6$, since the data would need to retraverse data link 130 to reach destination network node 116.

A number of different search strategies may be employed to explore the path deviations. For example, the updated costs for the path deviations may be sorted and used to determine which paths are explore first to generate the set of lowest cost paths. In another example, path deviations may be explored starting from the source node or another reference node in the data network. For example, data link 122 may be explored first as a possible alternative route from network node 102 to destination network node 116.

During exploration of the map, path deviations that lead to loops may also be excluded from further exploration. In one example, data links in map 400 may be explored in the following order: data link 120, data link 124, data link 122. Since network node 102 has already been explored along this path, a loop has been reached and the path may be excluded from being added to the set of lowest cost paths. Further exploration of the path (e.g., by following data link 120, data link 126, etc.) may also be excluded, in some implementations.

Figure 5:
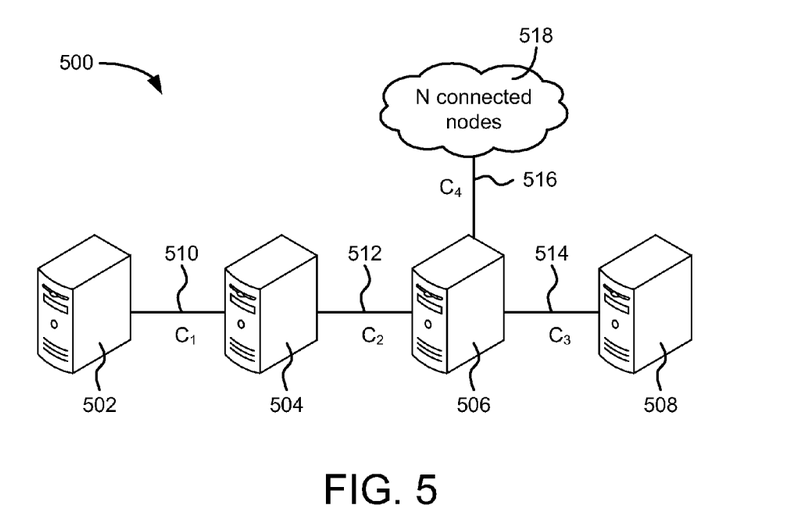
FIG. 5 is an illustration of an example data network having a plurality of connected nodes.

FIG. 5 shows a data network 500 having a plurality of nodes is shown according to one example. Data network 500 includes network nodes 502, 504, 506, and 508, which are configured to receive and transmit data within data network 500. A data link 514 connects network node 508 to network node 506 and has an associated cost of $c_3$. A data link 512 connects network node 506 to network node 504 and has an associated cost of $c_2$. Similarly, a data link 510 connects network node 504 to network node 502 and has an associated cost of $c_1$. Data links 510, 512, and 514 may be bidirectional in some instances. In such cases, each direction of data flow along a data link may have a separate associated cost that may or may not be the same in either direction.

Network 500 is also shown to include a network cluster 518, which has a plurality of connected network nodes. The network nodes in network cluster 518 may be connected by unidirectional and/or bidirectional data links, similar to those of data links 510, 512, and 514. A data link 516 connects network node 506 to network cluster 518 and has an associated cost of $c_4$ to the first network node in cluster 518.

Certain topologies, such as that of data network 500, may be time consuming to analyze using some shortest path search strategies, such as process 200. For example, suppose process 200 is used to determine the set of the three lowest cost paths from network node 504 to destination network node 502. The overall lowest cost path from network node 504 contained in the resulting set of lowest cost paths from each node to destination network node 502 traverses only data link 510. However, one specific criterion of process 200 is that the set of lowest cost paths between a source node and a destination node found by process 200 contains only loopless paths. Under this criterion, second and third lowest cost paths do not exist between source network node 504 and destination network node 502.

Exploration of the paths of data network 500 by a strictly greedy search strategy, such as in process 200, would result in exploration of each possible path in data network 500. For example, one path exploration may begin by traversing data link 512 from network node 504 to network node 506 and then traversing data link 516 from network node 506 to a first node of cluster 518. Within cluster 518, the path exploration may continue from the first node of cluster 518 until a loop is reached. Since the explored path contains a loop, it will not be included in the set of lowest cost paths from source network node 504 to destination network node 502. Exploration of subsequent paths will proceed in a similar manner, traversing data links into cluster 518 and being unable to find a loopless path to destination network node 502. This process will continue until all possible paths from source network node 504 have been explored and exhausted.

Figure 6:
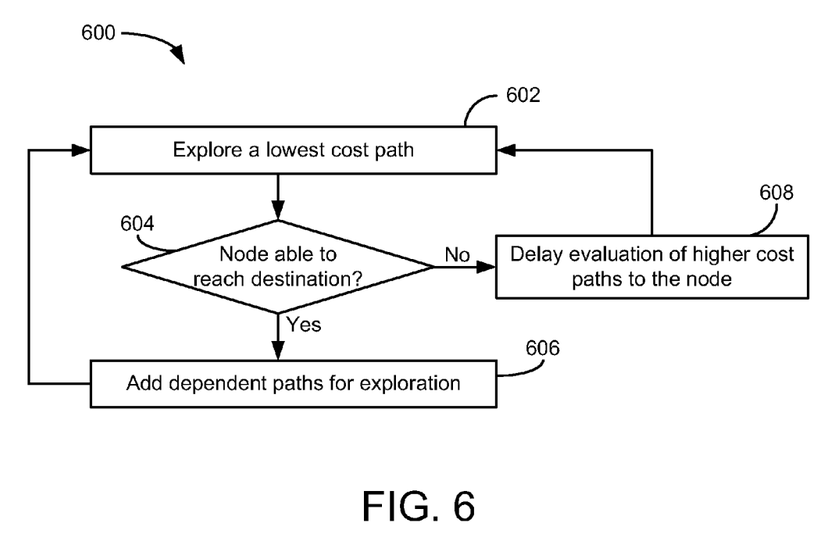
FIG. 6 is a flow diagram of an example process for determining a set of lowest cost paths from a source node to a destination node in a data network by delaying exploration of some paths.

FIG. 6 shows a flow diagram of a process for determining a set of lowest cost paths between a source node and a destination node in a data network by delaying exploration of some paths. Process 600 may be used as part of the exploration of paths in a shortest path search strategy, such as in step 206 of process 200. In process 600, an evaluation is made as to whether or not a path has been found from a given network node to the destination network node. Other, higher-cost paths that lead to this network node are not explored unless a path from the network node to the destination network node is found.

Process 600 includes exploring a lowest cost path (block 602). In a greedy search strategy, lowest cost paths are explored first, since the overall goal is to determine a set of the lowest cost paths in the data network. Various techniques may be used to determine which path to explore. For example, a priority queue or other data structure that sorts paths by cost may be used to order which paths are to be explored first. As new paths become eligible for exploration and added to the priority queue or other data structure, the priority queue or other data structure may be resorted to ensure that the next path to be explored has the lowest associated cost. This allows exploration of the paths to be conducted in a greedy manner, thereby always giving preference to the lowest cost paths, first.

In some implementations, exploration of a path may involve analyzing the current properties of the terminal network node in the path. Node properties may include, for example, whether or not the terminal node has been explored before, whether or not the terminal node is able to reach the destination, a set of nodes that can be traversed from the terminal node to reach the destination, and dependent paths (e.g., paths that are waiting for the current path to discover a path from the terminal node to the destination). Node properties may also be updated as paths are explored.

Process 600 is shown to include determining if the terminal node of the explored path is able to reach the destination (block 604). As paths are explored, the node properties of each node in the explored path may be updated. In one example, if the terminal node of an explored path is also the destination network node, this indicates that all nodes in the explored path are able to reach the destination node. In this case, the node properties of each node in the explored path may be updated to reflect that the node is able to reach the destination network node. A list of nodes that connect the node to the destination may also be maintained in its node properties. The node properties of the terminal node, therefore, may reflect that a path exists from it to the destination and also include the set of nodes linking the terminal node to the destination network node.

Process 600 is shown to include adding the dependent paths of the currently explored path as candidates for further exploration (block 606). If the terminal node of the currently explored path is determined to be able to reach the destination, paths that depend on the currently explored path may be added to the priority queue or other data structure for further exploration. For example, a dependent path may have a higher associated cost than the currently explored path, but may still need to be explored to determine the set of lowest cost paths. These paths then become eligible for exploration once it is known that the terminal node of the currently explored path is able to reach the destination.

Process 600 is shown to include delaying evaluation of higher cost paths to the node (block 608). If the terminal node of the currently explored path is determined to not be able to reach the destination network node, exploration of higher cost paths that also lead to the terminal node is delayed. If the terminal node of the currently explored path is never found to be able to reach the destination network node, the dependent paths are never explored. This significantly reduces the amount of time and resources needed to find the set of lowest cost paths between a source node and a destination node for some network topologies, such as data network 500 in FIG. 5.

Process 600 may be repeated to find a set of lowest cost paths from the source to the destination. For example, process 600 may be repeated until the three lowest cost paths are found. If less than three paths exist between the source and destination, process 600 may end when the set of paths eligible for exploration is exhausted. In such a case, the paths for which exploration was delayed may not be explored at all.

Figure 7:
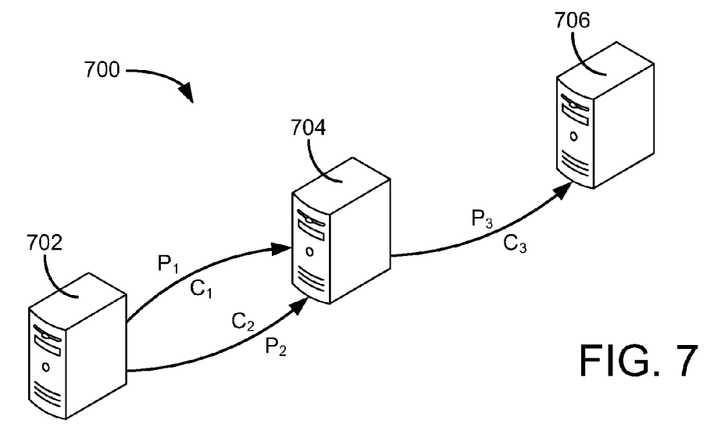
FIG. 7 is an illustration of a set of paths for exploration.

FIG. 7 shows a set of paths for exploration according to one example. A data network 700 includes network nodes 702, 704, and 706. A number of paths $P_1$, $P_2$, and $P_3$ for exploration are also shown. Path $P_1$ connects network node 702 to one or more other network nodes, including terminal network node 704 (e.g., path $P_1$ currently terminates at network node 704). Path $P_1$ also has an associated cost $c_1$, which may be the sum of the associated costs for the data links contained within path $P_1$. Path $P_2$ also connects network node 702 to one or more other network nodes, including terminal network node 704 (e.g., path $P_2$ also currently terminates at network node 704). Path $P_2$ also has an associated cost $c_2$, which may be the sum of the associated costs for the data links contained within path $P_2$.

Exploration of paths that stem from either path $P_1$ or path $P_2$ may be delayed, since both paths $P_1$ and $P_2$ lead to terminal network node 704. For example, if the associated cost of traveling path $P_1$ to terminal network node 704 is less than that of traveling path $P_2$ to terminal network node 704, i.e., $c_1<c_2$, exploration of paths that stem from path $P_2$ may be delayed. In some implementations, a tie breaker may be employed if the costs are equal. For example, network nodes or data links may be sorted lexicographically, in addition to cost. Lexicographic provides an ordering based on the arrangement of characters in a name or identifier associated with a data link For example, path $P_1$ may be explored before path $P_2$, if $c_1=c_2$, since the identifier "$P_1$" may precede "$P_2$" lexicographically. In this way, the lexicographic order of the nodes or data links can be used to break a tie. If exploration of path $P_2$ is delayed, exploration of the paths that stem from $P_2$ may be dependent on the results of the exploration of the paths that stem from $P_1$. If a path $P_3$ connecting terminal network node 704 to destination network node 706 is found to exist with associated cost $c_3$, the associated cost of $P_1+P_3$ is guaranteed to be less than the associated cost of $P_2+P_3$, i.e., $(c_1+c_3)<(c_2+c_3)$. At this point, path $P_2$ and its related paths may be released for further exploration, if the desired number of paths are not found.

If no path is able to reach destination node 706 from terminal network node 704 via exploration of the paths that stem from $P_1$, the paths that stem from path $P_2$ may remain unexplored. This has the effect of reducing the time needed to generate the set of lowest cost paths from network node 702 to destination network node 706, since only some of the possible paths are explored. Not exploring some paths also has the further effect of reducing the amount of resources consumed by the processing circuit that determines the lowest cost networking paths.

Figure 8:
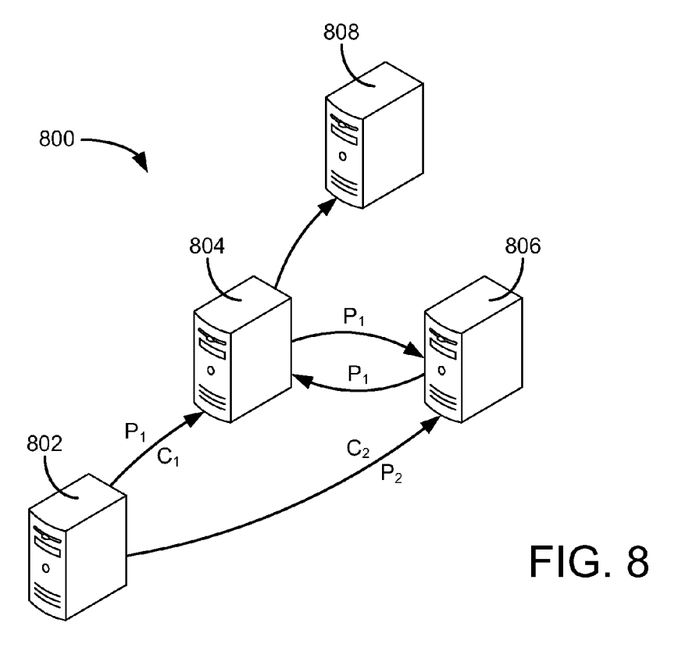
FIG. 8 is an illustration of another set of paths for exploration.

FIG. 8 shows a set of paths for exploration according to another example. A data network 800 includes network nodes 802, 804, 806, and 808. Paths $P_1$ and $P_2$ for exploration are also shown. In this example, path $P_1$ contains a loop and connects network node 802 to network node 804 which connects to network node 806, and connects back to network node 804. Path $P_1$ also has an associated cost $c_1$, which may be the sum of the associated costs for the data links contained within path $P_1$. Path $P_2$ connects network node 802 to one or more other network nodes, including network node 806, which is also within path $P_1$.

In this example, path $P_1$ may be explored before path $P_2$ because its cost is lower, i.e., $c_1<c_2$. However, path $P_1$ contains a loop, since the data would travel from network node 804 to network node 806 and back to network node 804. This information may be used to determine that a loop exists (e.g., by detecting the presence of repeated nodes in a path, by detecting the traversal of a data link in opposite directions, etc.). In some implementations, related paths that contain path $P_1$ may then be excluded from further exploration and/or excluded from being included in the final set of lowest cost paths.

According to one implementation, the node properties of terminal network node 804 of path $P_1$ may still be assessed, even though path $P_1$ contains a loop. If network node 804 is able to reach destination network node 808, this means that all of the other nodes in path $P_1$ are also able to reach network node 808, provided that they travel to network node 804. In such a case, the node properties of the nodes in path $P_1$ can be updated to reflect this. For example, the node properties of network node 806 can be updated to reflect that it is able to reach destination network node 808 via network node 804. The paths that include $P_2$, then, may be released for further exploration if they have not yet been expanded out to network node 804.

If a connection has not been found between network node 806 and destination network node 808, the exploration of path $P_2$ may be delayed. Since path $P_2$ terminates at network node 806, exploration of paths that include $P_2$ may be dependent on network node 806 being able to reach destination network node 808. In the case where a connection between network node 804 and destination network node 808 has not yet been found and, consequently, a connection between network node 806 and destination network node 808 also has not been found, further exploration of the paths that contain path $P_2$ may be delayed. If no connection is ever found between network node 806 and destination network node 808, paths that contain path $P_2$ may never been explored, thereby reducing the number of paths that are evaluated. In this way, loops can still be excluded while the exploration of certain paths can also be delayed.

Figure 9:
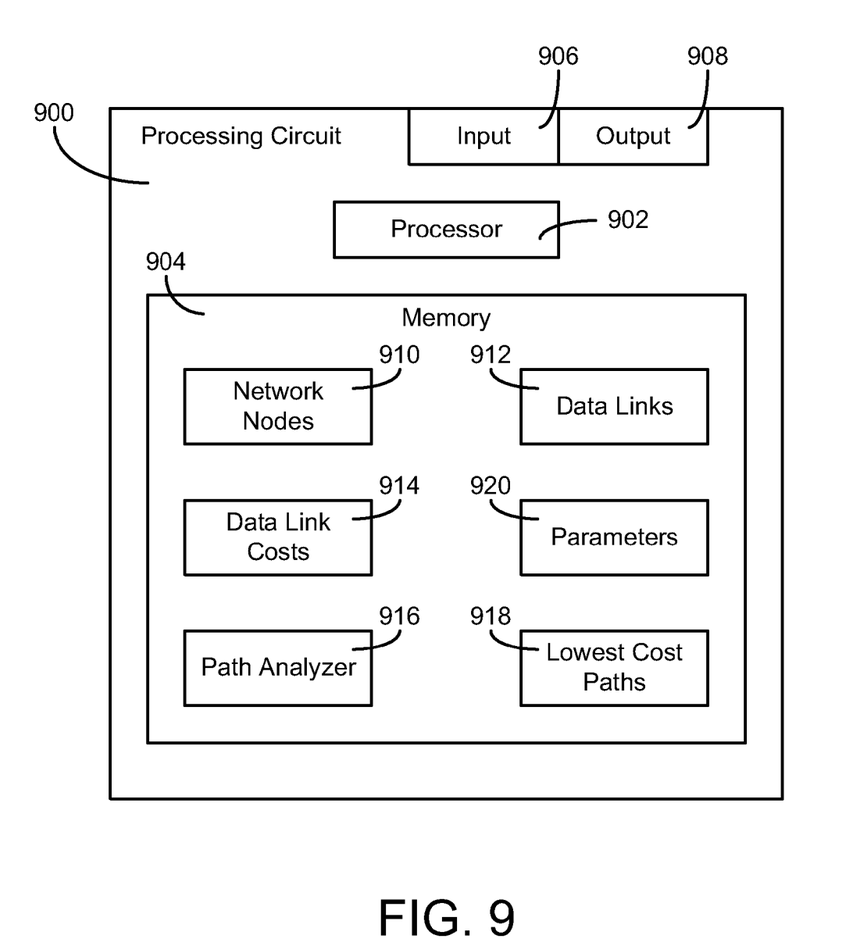
FIG. 9 is a schematic block diagram of a processing circuit configured to determine a set of lowest cost paths from a source node to a destination node for a data network.

FIG. 9 shows a detailed block diagram of a processing circuit 900. Processing circuit 900 may be within, for example, a network router, a server, or another device connected to a data network. Processing circuit 900 includes a processor 902 and a memory 904. Processor 902 may be or include one or more microprocessors, an application specific integrated circuit (ASIC), a circuit containing one or more processing components, a group of distributed processing components, circuitry for supporting a microprocessor, or other hardware configured for processing. Processor 902 is also configured to execute computer code stored in memory 904 to complete and facilitate the activities described herein. Memory 904 can be any volatile or non-volatile computer-readable medium capable of storing data or computer code relating to the activities described herein. For example, memory 904 is shown to include path analyzer 916, which may be implemented using computer code (e.g., executable code, object code, source code, script code, machine code, etc.) configured for execution by processor 902. When executed by processor 902, processing circuit 900 is configured to complete the activities described herein.

Processing circuit 900 also includes hardware circuitry for supporting the execution of the computer code path analyzer 916. For example, processing circuit 900 includes hardware interfaces (e.g., output 908) for communicating the set of lowest cost paths 918 (e.g., the set of lowest cost paths from a source node to a destination node) to other computing devices (e.g., another router, another server, a mobile device, etc.). Processing circuit 900 may also include an input 906 for receiving, for example, a set of network nodes 910, data links 912, data link costs 914, and/or parameters 920 from other computing devices.

Memory 904 includes network nodes 910, which represent the set of network nodes in the data network to be analyzed. Network nodes 910 may include, for example, information representative of the set of data centers, routers, servers, or other electronic devices configured to receive and/or transmit data via the data network. In some implementations, network nodes 910 may be a partial set of the network nodes of the data network. For example, certain nodes on the data network may be excluded from analysis by path analyzer 916 when the set of lowest cost paths from a source node to a destination node is determined.

Memory 912 includes data links 912, which represent links of the data network over which two or more network nodes communicate. Data links 912 may include, for example, information representative of the two or more data nodes (e.g., a set of pointers to network nodes 910, a list of unique identifiers of network nodes 910, etc.) for a given data link. Data links 912 may also include information indicative of a direction of data flow over a link. For example, data links 912 may be unidirectional or bidirectional, depending on the configuration of the data network. If data can travel in two over more directions, each direction of flow may be represented separately in data links 912, in some implementations. For example, the connection from node A to node B may be stored as a separate data link in data links 912 than that of the connection from node B to node A.

Memory 904 includes data link costs 914, which are associated with data links 912. Data link costs 914 may be one or more metrics or characteristics of data links 914. For example, the latency, bandwidth, financial cost, physical distance, or other information associated with data links 914 may be stored in data link costs 914. In one implementation, the roundtrip ping times over data links 914 may be stored in memory 904 as data link costs 914. Data link costs 914 may be received from one or more other processing circuits via input 906 or determined by processing circuit 900, according to various implementations.

Memory 904 includes parameters 920. Parameters 920 are used to control the operation of processing circuit 900. Parameters 920 may include one or more data values that cause processing circuit 900 to operate differently, depending on the data values. For example, parameters 920 may include a selection of a start network node and a destination network node received via input 906. These may be used by path analyzer 916 to generate different sets of lowest cost paths 918. In another example, parameters 920 may include a selection of how many lowest costs paths are to be determined by path analyzer 916 (e.g., the two lowest cost paths, the three lowest cost paths, etc.). In a further example, parameters 920 may include a parameter that controls whether or not path analyzer 916 excludes loops and/or delays evaluation of paths. Other examples of parameters 920 include parameters that control how often the sets of lowest cost paths 918 are generated, how the sets of lowest cost paths 918 are used, and whether certain members of network nodes 910 or data links 912 should be excluded from analysis by path analyzer 916.

Memory 904 includes a path analyzer 916. Path analyzer 916 utilizes the selected source node and destination node in parameters 920, network nodes 910, data links 912, and data link costs 914, to generate lowest cost paths 918. In some implementations, path analyzer 916 may use network nodes 910, data links 912, and data link costs 914 to generate a set of lowest cost paths from each of network nodes 910 to a destination. The set of lowest cost paths from each network node 910 to the destination may be generated, for example, using a single-source shortest path search strategy between each node and the selected destination node. Path analyzer 916 may also use the generated set to determine path deviation costs to reach the destination node from the source node. Since the set of shortest paths from network nodes 910 to the destination network node includes the lowest cost path from the source network node to the destination node, any path that deviates from this will have an equal or greater cost. These costs may then be used by path analyzer 916 to determine other paths from the source node to the destination node. In some implementations, path analyzer 916 may employ a greedy search strategy or other search strategy to explore the determined deviation paths.

As path analyzer 916 is exploring a given path, it may determine if the path contains a loop. If a loop is found during the exploration of the paths by path analyzer 916, it may exclude the path and other paths that contain the loop from further analysis and/or prevent their inclusion in lowest cost paths 918. In one example, path analyzer 916 may determine that an explored path contains a loop by detecting the presence of a duplicated network node along the path. In another example, path analyzer 916 may determine that an explored path contains a loop by detecting the traversal of a data link in both directions. Path analyzer 916 may also delay exploration of certain paths during the analysis, in some implementations. For example, path analyzer 916 may delay exploring a certain path, as well as those paths that extend from it, if its terminal network node can be reached by a lower cost path. If path analyzer 916 is able to find a connection between the terminal network node and the destination network node, the delayed path may be later released for further exploration. However, if a connection between the terminal network node and the destination network node cannot be found via the lower cost path, path analyzer 916 may never explore the higher cost path and those paths that contain the higher cost path.

In one implementation, path analyzer 916 may maintain node properties for network nodes 910, as paths are explored. For example, pseudocode for such node properties may include the following:

```
struct NodeInfo
{
    bool being_explored_from;
    bool path_to_dst;
    set<const Node*>must_travel_to_dst;
    list<Path*>dependent_paths;
}
``` where NodeInfo contains the current node properties for a node while paths are explored. The flag being_explored_from, may be set to true if any path is exploring from the node to the destination. Similarly, the flag, path_to_dst, may be set if any connection from the node to the destination has been found. The set, must_travel_to_dst, contains the set of nodes that must be traversed to reach the destination. The list, dependent_paths, contains those paths for which exploration is delayed until a connection is found from the node to the destination by exploring a lower cost path.

Path analyzer 916 may use the node properties during exploration of the paths. In some implementations, path analyzer 916 may utilize a priority queue or other data structure that operates to keep the lowest cost path on top. If two paths are of equal cost, the priority queue or other data structure may use other information about the path (e.g., the path with the smallest node names, etc.) to determine which path has priority. Pseudocode for using the priority queue to explore paths is as follows:

---

1. Pop first path from priority_queue
   a. Find NodeInfo for last node in path
   b. if path_to_dst is false or must_travel_to_dst is not met:
      i. if being_explored_from:
         1. add path* to dependent_paths
      ii. else:
         1. being_explored_from = true
   c. if reached dst:
      i. Find NodeInfo for last node in path
      ii. traverse all nodes in path and for each corresponding NodeInfo:

-continued

```
      1. mark path_to_dst as true
      2. move dependent_paths to priority_queue
   d. if reached cycle:
      i. if cycle node has path_to_dst:
         1. traverse all nodes in path and for each corresponding
            NodeInfo:
               a. mark path_to_dst as true
               b. Add the cycle node in must_travel_to_dst
               c. move dependent_paths that satisfies
                  must_travel_to_dst to priority_queue
2. Extend the paths with outgoing edges
3. For each new path, add them to priority_queue
```

Path analyzer 916 may use such a strategy to explore paths, in order to find paths from the source network node to the destination network node. Exploration of a higher cost path is delayed (and may be avoided entirely) if a lower cost path leads from the source network node to the terminal node of a higher cost path. If no path from the terminal node is found by path analyzer 916, the higher cost path may not be explored further.

Path analyzer 916 generates lowest cost paths 918 and stores them within memory 904. Lowest cost paths 918 includes a plurality of paths from the source node to the destination node that are determined by path analyzer 916 to have the lowest associated costs. The number of paths between the source and destination in lowest cost paths 918 may be controlled, for example, by one or more values in parameters 920. For example, lowest cost paths 918 may include the five lowest cost paths between the source and destination network nodes. In some implementations, lowest cost paths 918 may include sets of other lowest costs paths between different source and/or destination network nodes. For example, lowest cost paths 918 may include a set of lowest cost paths from a source node to a first destination node and a set of lowest cost paths from the source node to a different destination node.

Lowest cost paths 918 may also be used to make routing decisions in the data network. For example, processing circuit 900 may provide lowest cost paths 918 to routers and other devices in a data network via output 908. In another implementation, processing circuit 900 may use lowest cost paths 918 to determine where data is to be sent from processing circuit 900. For example, processing circuit 900 may receive a request via input 906 to send data to another device via output 908 and utilize lowest cost paths 918 to determine how the data is to be sent to the other device.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. For example, while certain implementations are described herein with respect to routing data in a data network, the methodologies described could also be applied to other areas, such as determining the best routes of a map that may be traveled by a person or vehicle. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   retrieving, from a memory, map data identifying a plurality of network nodes and a plurality of data links between the network nodes, wherein each data link has an associated cost;
   receiving an identification of a source network node and a destination network node in the plurality of network nodes;
   determining, by a processing circuit, a set of respective single lowest cost paths between the destination network node and each other network node of the plurality based in part on the associated costs of the plurality of data links;
   determining, by the processing circuit, a set of paths to be explored based in part on the difference between the map data and the set of respective single lowest cost paths between the plurality of network nodes and the destination network node; and
   determining, by the processing circuit, a set of at least two lowest cost paths from the source network node to the destination network node by exploring one or more paths in the set of paths to be explored, wherein determining the set of at least two lowest cost paths from the source network node to the destination network node comprises excluding an explored path that contains a loop.

2. The method of claim 1, wherein determining the set of at least two lowest cost paths from the source network node to the destination network node further comprises delaying exploration of one or more paths in the set of paths to be explored based in part on a determination of whether a terminal network node of the one or more paths being delayed from exploration can be reached by a lower cost path from the source network node to the terminal network node than that of the paths being delayed from exploration.

3. The method of claim 2, wherein the one or more paths being delayed from exploration are explored when a connection from the terminal network node to the destination network node is found.

4. The method of claim 3, wherein the lower cost path comprises a loop that includes the terminal node, wherein determining the set of at least two lowest cost paths from the source network node to the destination network node further comprises determining if a connection between a network node in the loop to the destination network node has been found.

5. The method of claim 1, wherein the paths to be explored are explored in order of associated cost and lexicographic order.

6. The method of claim 1, further comprising utilizing the set at least two of lowest cost paths to route data from the source network node to the destination network node.

7. A processing circuit configured to retrieve, from a memory, map data identifying a plurality of network nodes and a plurality of data links between the network nodes, wherein each data link has an associated cost, wherein the processing circuit is further configured to:
  receive an indication of a source network node and a destination network node in the plurality of network nodes;
  determine a set of respective single lowest cost paths between the destination network node and each other network node of the plurality based in part on the associated costs of the plurality of data links;
  determine a set of paths to be explored based in part on the difference between the map data and the set of respective single lowest cost paths between the plurality of network nodes and the destination network node; and
  determine a set of at least two lowest cost paths from the source network node to the destination network node by exploring one or more paths in the set of paths to be explored, wherein determining the set of at least two lowest cost paths from the source network node to the destination network node comprises excluding an explored path that contains a loop.

8. The processing circuit of claim 7, wherein the processing circuit is configured to determine the set of at least two lowest cost paths between the source network node and the destination network node by delaying exploration of one or more paths in the set of paths to be explored based in part on a determination of whether a terminal network node of the one or more paths being delayed from exploration can be reached by a lower cost path from the source network node to the terminal network node than that of the paths being delayed from exploration.

9. The processing circuit of claim 8, wherein the one or more paths being delayed from exploration are explored when a connection from the terminal network node to the destination network node is found.

10. The processing circuit of claim 9, wherein the lower cost path comprises a loop that includes the terminal node, wherein determining the set of at least two lowest cost paths from the source network node to the destination network node further comprises determining if a connection between a network node in the loop to the destination network node has been found.

11. The processing circuit of claim 9, wherein the processing circuit is further configured to explore the set of paths to be explored in order of associated cost and lexicographic order.

12. The processing circuit of claim 7, wherein the processing circuit is further configured to utilize the set of at least two lowest cost paths from the source network node to the destination network node to route data from the source network node to the destination network node.

13. The processing circuit of claim 7, wherein the processing circuit is further configured to provide the set of at least two lowest cost paths from the source network node to the destination network node to another electronic device.

14. One or more non-transitory computer-readable media having instructions stored therein, the instructions being executable by one or more processors to cause the one or more processors to perform operations comprising:
  retrieving, from a memory, map data identifying a plurality of network nodes and a plurality of data links between the network nodes, wherein each data link has an associated cost;
  receiving an identification of a source network node and a destination network node in the plurality of network nodes;
  determining, by the one or more processors, a set of respective single lowest cost paths between the plurality of network nodes and the destination network node based in part on the associated costs of the plurality of data links;
  determining, by the one or more processors, a set of paths to be explored based in part on the difference between the map data and the set of respective single lowest cost paths between the plurality of network nodes and the destination network node; and
  determining, by the one or more processors, a set of at least two lowest cost paths from the source network node to the destination network node by exploring one or more paths in the set of paths to be explored, wherein determining the set of at least two lowest cost paths from the source network node to the destination network node comprises excluding an explored path that contains a loop.

15. The one or more non-transitory computer-readable media of claim 14, wherein determining the set of at least two lowest cost paths from the source network node to the destination network node further comprises delaying exploration of one or more paths in the set of paths to be explored based in part on a determination of whether a terminal network node of the one or more paths being delayed from exploration can be reached by a lower cost path from the source network node to the terminal network node than that of the paths being delayed from exploration.

16. The one or more non-transitory computer-readable media of claim 15, wherein the one or more paths being delayed from exploration are explored only when a connection from the terminal network node to the destination network node is found.

17. The one or more non-transitory computer-readable media of claim 16, wherein the lower cost path comprises a loop that includes the terminal node, wherein determining the set of at least two lowest cost paths from the source network node to the destination network node further comprises determining if a connection between a network node in the loop to the destination network node has been found.

18. The one or more non-transitory computer-readable media of claim 14, wherein the paths to be explored are explored in order of associated cost and lexicographic order.

19. The one or more non-transitory computer-readable media of claim 14, wherein the method further comprises utilizing the set of at least two lowest cost paths from the source network node to the destination network node to route data from the source network node to the destination network node.

20. The one or more non-transitory computer-readable media of claim 14, wherein the associated cost of each data link is based on a ping time between nodes connected by the data link.

* * * * *